(No Model.)
C. M. COLLINS.
MEANS FOR RECORDING PRESSURE OF WATER.
No. 531,778. Patented Jan. 1, 1895.
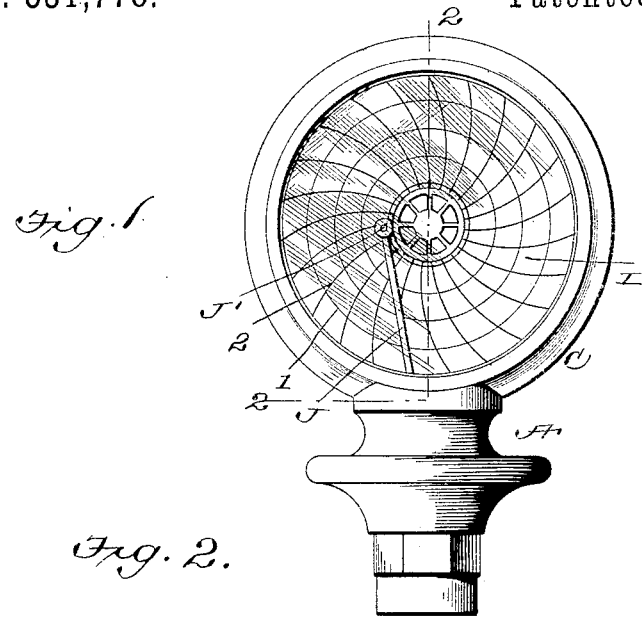
Fig. 1.
Fig. 2.
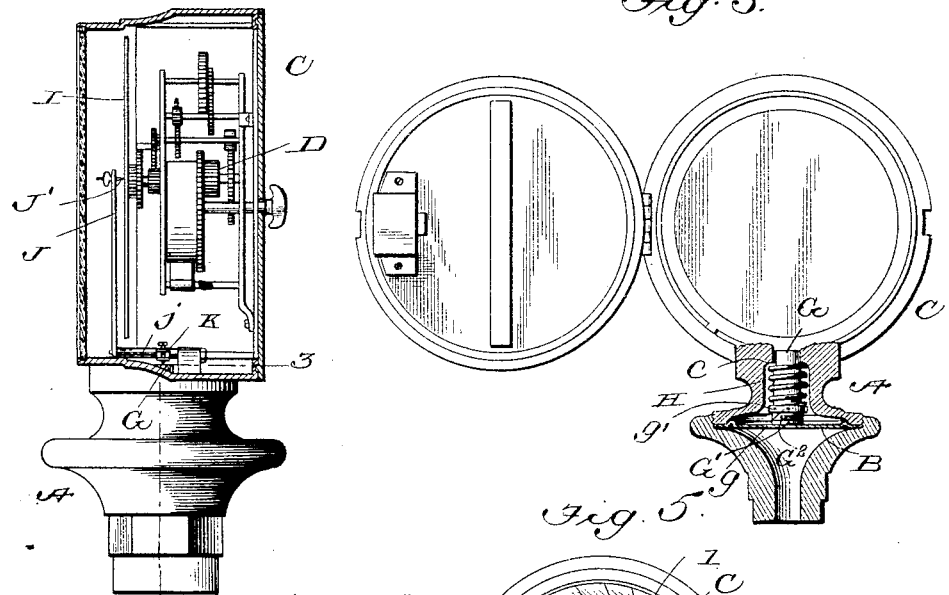
Fig. 3.
Fig. 5.
Fig. 4.
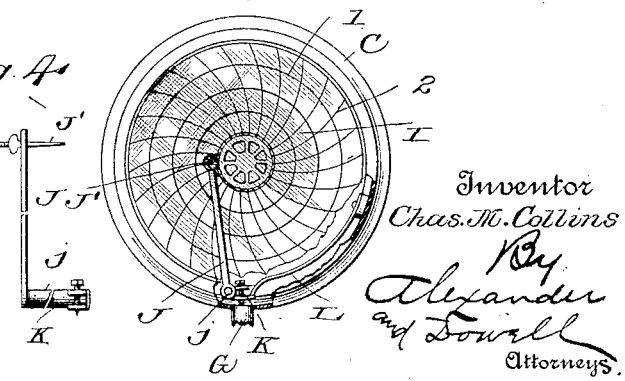
Witnesses
John Irwine
James R. Mansfield
Inventor
Chas. M. Collins
By
Alexander and Dowell
Attorneys

UNITED STATES PATENT OFFICE.

CHARLES M. COLLINS, OF SOUTH BEND, INDIANA.

MEANS FOR RECORDING PRESSURE OF WATER.

SPECIFICATION forming part of Letters Patent No. 531,778, dated January 1, 1895.

Application filed May 19, 1894. Serial No. 511,780. (No model.)

*To all whom it may concern:*

Be it known that I, CHARLES M. COLLINS, of South Bend, in the county of St. Joseph and State of Indiana, have invented certain new and useful Improvements in Recording the Pressure of Water; and I do hereby declare that the following is a full, clear, and exact description thereof, reference being had to the accompanying drawings, and to the letters of reference marked thereon, which form part of this specification.

This invention is an improvement in instruments for indicating and recording the pressure of water as drawn from service pipes, and the time and duration of such drawings, and it consists substantially in a clock mechanism for rotating an indicator or recorder disk, mounted upon a diaphragm meter or gage, connected to the service pipe or other point where it is desired to record the pressure of the water and time and duration of such pressure, and a recording mechanism operated from said diaphragm meter so as to move a marker upon the disk, as will be hereinafter explained in detail.

Referring to the drawings which illustrate a practical form of the invention, Figure 1 is a face view of the complete instrument. Fig. 2 is a vertical transverse sectional view thereof on line 2—2 Fig. 1. Fig. 3 is a vertical sectional view on line 3—3 Fig. 2, also showing the case open and mechanism removed. Figs. 4 and 5 are details.

The diaphragm casing A is bulbous in shape and is made in two parts upper and lower, the latter being adapted to be secured at a suitable point to a water pipe or other conduit or receptacle therefor, and to the upper part is secured a case C in which is removably placed a clock mechanism D of any suitable construction.

Within the pressure chamber in casing A is secured a diaphragm B of any suitable material which will yield to pressure, and above the diaphragm, is a stem G the upper end of which extends almost into case C. A small helical spring H is placed on said stem intermediate a shoulder $c$ of case C and a nut $g$ on the stem, whereby the lower end of stem is kept in contact with the diaphragm, and the latter normally depressed. On the hour-hand arbor of the clock mechanism is a disk I which may be detachable, and may have its face marked with circular division lines 1, and curved lines 2, as shown, or these marks may be and preferably are printed upon sheets of paper detachably secured to the face of the disk, as in various other kinds of indicators and recorders.

The indicator or marker arm J is pivoted within the case C near the upper end of the stem G, but in such manner that the clock work and disk can be removed through the back of case without disturbing the marker. On the hub of arm J is a short arm $j$, which overlies the end of the stem G, and is or may be provided with an adjustable needle point K which impinges and rests on the top of said stem, so that longitudinal vibration of the stem will cause the vibration of arm J, and owing to the difference in length of the arms J, $j$, the former will move perceptibly when the movement of the latter is imperceptible. Thus the movement of arm J is directly dependent upon and governed by the movement of the diaphragm.

A spring L (see Fig. 5) secured in the case C, presses upon arm $j$ and serves to keep the point K in continual contact with stem G. On the extremity of the arm J is a marking point J' of any suitable construction, which is kept in contact with the disk I so as to insure proper recording thereon of the movements of said arm.

The operation of the device, when applied to a service pipe is as follows: The recorder is attached to the service pipe at a point beyond the stop cock, so that no pressure is exerted on the diaphragm until the cock is opened. As soon as the water is turned on by the user it will fill the lower chamber of the diaphragm case and press the diaphragm B. This will raise the stem G, and throw the indicator arm J out upon the recording disk a distance proportionate to the pressure, and as the disk is being rotated once every twenty-four hours the mark thus made upon it would indicate the pressure at which the water was drawn, and the length of time it was used at that pressure. Now it is evident that if the parties use the water with an "open butt," as it is called, the flow would be met by a less resistance and hence less pressure upon the diaphragm and hence the marker or indicator point would not be thrown so far from the center; whereas if it were used through a small nozzle the resistance would be greater, the pressure would be higher on the diaphragm, and the pencil point would be thrown farther from the center, and the length of the mark would show the length of time at which the water was used with this mode of discharge. If, however, at any time the nozzle is open simply for the purpose of drawing a bucket of water the pencil point will be thrown out and will make a comparatively radial mark, so that the disk, at the end of twenty-four hours, will be a telltale, not only as to the length of time that the water was used but as to the character of such use, whether a flow through an open butt or a temporary withdrawal of a few buckets for house use. The lower part of the diaphragm case is filled with water, but the upper portion of the chamber is, of course, dry and separated from the water by the diaphragm which has to stand the entire pressure of the water.

The recording arm is pivoted to case C, but the disk is attached to the clock movement which is inserted into case C, and can be removed therefrom by simply opening the back and slipping the works out. This would be of advantage in case the movement should become defective or need repairs. As it is the movement can be slipped into its place without the necessity of dismantling any of the working parts, or it can be taken out and a new paper placed upon the disk and reinserted, when it will be ready for a new record. These paper disks can be filed in the office of the water works and will give a graphic history of the way the water has been used by the taker, and will be a check upon the extravagant or unwarranted use of water.

Of course the device is applicable and useful to determine the pressure of fluids at and during certain periods of time besides in the specific manner described above.

I find that the diaphragms even though they are made to the same gage, will not spring to the same extent under the same pressure; owing to the inequality in the temper of the diaphragm; or to the slight difference in pressure and tension produced by clamping the diaphragm between the two portions of the casing. To remedy this difficulty the lower portion of stem G is threaded as at G' and provided with nut $g$. The tendency of the spring H is to continuously thrust the stem G downward upon the diaphragm. Now, in any given diaphragm, when the pressure of forty pounds of water is turned on, if the index finger J is not thrown out far enough to reach the forty pounds line on the disk, then the nut $g$ is reversed and the pressure of the spring is reduced so that the water pressure may throw the recording finger far enough out to read the required number. If however the diaphragm, under a pressure of water at forty pounds, should be found to throw the recording finger J beyond the forty pounds line on disk then by turning up nut $g$, and compressing spring H, it is evident that the resistance to the water pressure on the diaphragm is increased, and hence the throw of the recording finger can be regulated to the required number of pounds of pressure; so by adjusting this nut on the stem, either up or down, any inequalities that may arise from the temper or clamping of the diaphragm can be compensated for. To make this adjustment, there is a hole $G^2$ in the point of the stem, and nut $g$ is provided with a series of holes $g'$ to turn it. A sharp pointed tool is inserted in the hole $G^2$ through a slot in the upper part of the casing, thus holding the pin firm while, by the aid of a similar tool inserted in one hole and then another of the nut the latter can be turned forward or backward to any required degree of adjustment.

Having thus described my invention, what I claim as new, and desire to secure by Letters Patent thereon, is—

1. The combination with the casing containing a pressure chamber, and a movable spring controlled stem therein, adapted to be raised by the pressure of fluid in said chamber and means for varying or regulating the spring pressure; with a case mounted on said casing, a clock mechanism removably mounted in said casing, and a disk carried by said clock mechanism; and a recording arm pivoted in said casing above the stem, and adapted to be vibrated by the movement of said stem, substantially as and for the purpose specified.

2. The combination of a casing, a diaphragm therein, a stem above said diaphragm, a case secured to and above the casing, a spring for depressing said stem, means for regulating the tension of such spring, a recording arm pivoted in said case above said stem having a short arm contacting the stem, and a clock mechanism detachably secured in said case independently of the arm, and a recording disk carried by the clock mechanism, all substantially as and for the purpose set forth.

3. The combination of the casing, the diaphragm therein, the stem G the recording arm J its short arm $j$, and the spring L, with the disk I, and clock mechanism for rotating the same, substantially as and for the purpose described.

4. The combination of the casing, the diaphragm therein, the stem G adjustable nut $g$ and spring H, the recording arm J its short arm $j$, and the spring L, with the disk I, and clock mechanism for rotating the same, substantially as and for the purpose described.

5. The combination of the casing adapted to be secured to a service pipe, the diaphragm therein, the stem G and its spring in said casing above the diaphragm; the case secured over said casing, the recording arm J and its stub arm *j*, the adjustable needle point K, and spring L, with the removable clock mechanism D, and disk I, all constructed and arranged to operate substantially as and for the purpose set forth.

In testimony that I claim the foregoing as my own I affix my signature in presence of two witnesses.

CHARLES M. COLLINS.

Witnesses:
   JAMES DU SHANE,
   ROBERT W. BAST.